United States Patent
Bulpitt

(10) Patent No.: US 9,909,890 B2
(45) Date of Patent: Mar. 6, 2018

(54) OPTIMAL ENERGY SOURCE DETERMINATION SYSTEM

(71) Applicant: Toyota Motor Engineering & Manufacturing North America, Inc., Erlanger, KY (US)

(72) Inventor: Christopher M. Bulpitt, Los Angeles, CA (US)

(73) Assignee: TOYOTA MOTOR ENGINEERING & MANUFACTURING NORTH AMERICA, INC., Erlanger, KY (US)

(*) Notice: Subject to any disclaimer, the term of this patent is extended or adjusted under 35 U.S.C. 154(b) by 0 days.

(21) Appl. No.: 15/206,138

(22) Filed: Jul. 8, 2016

(65) Prior Publication Data

US 2018/0010918 A1 Jan. 11, 2018

(51) Int. Cl.
*G01C 21/34* (2006.01)
*G01C 21/20* (2006.01)

(52) U.S. Cl.
CPC ......... *G01C 21/3469* (2013.01); *G01C 21/20* (2013.01); *G01C 21/3476* (2013.01); *G01C 21/3484* (2013.01); *G01C 21/3492* (2013.01)

(58) Field of Classification Search
CPC ............... G01C 21/3469; G01C 21/20; G01C 21/3476; G01C 21/3484; G01C 21/3492
See application file for complete search history.

(56) References Cited

U.S. PATENT DOCUMENTS

| | | | |
|---|---|---|---|
| 7,668,644 B2 | 2/2010 | Tengler et al. | |
| 7,778,769 B2 | 8/2010 | Boss et al. | |
| 8,095,303 B1* | 1/2012 | Nesbitt | G01C 21/343 340/988 |
| 8,135,538 B2 | 3/2012 | Geelen et al. | |
| 8,712,676 B2 | 4/2014 | Hiestermann et al. | |
| 9,151,631 B2 | 10/2015 | Lee et al. | |
| 9,175,971 B1 | 11/2015 | Aldereguia et al. | |
| 9,234,766 B2 | 1/2016 | Burlingham et al. | |
| 2006/0129313 A1 | 6/2006 | Becker et al. | |
| 2008/0133120 A1 | 6/2008 | Romanick | |
| 2008/0243663 A1* | 10/2008 | Eveland | G01C 21/3469 705/35 |
| 2009/0005974 A1 | 1/2009 | Lenneman et al. | |

(Continued)

FOREIGN PATENT DOCUMENTS

DE 102009024528 3/2010

*Primary Examiner* — Rodney A Butler
(74) *Attorney, Agent, or Firm* — Snell & Wilmer LLP

(57) ABSTRACT

A system for providing a recommended route for a vehicle, from a current location to an intermediate destination, to a final destination. The system includes an electronic control unit (ECU) configured to determine a vehicle range exceeding a distance between the current location of the vehicle and the intermediate destination. The ECU is configured to determine a baseline route having a first section and a second section. The ECU is configured to determine a first energy source of the first section and a second energy source of the second section. The ECU is configured to determine a first cost associated with incorporating the first energy source and a second cost associated with incorporating the second energy source. The ECU is also configured to determine the recommended route based on the first cost and the second cost. The system also includes an output unit configured to output the recommended route.

14 Claims, 5 Drawing Sheets

(56) References Cited

U.S. PATENT DOCUMENTS

| | | |
|---|---|---|
| 2009/0109022 A1 | 4/2009 | Gangopadhyay et al. |
| 2010/0049397 A1 | 2/2010 | Liu et al. |
| 2011/0153195 A1* | 6/2011 | Broadbent ......... G01C 21/3626 701/533 |
| 2013/0253826 A1* | 9/2013 | Tava .................. G01C 21/3492 701/527 |
| 2013/0261955 A1* | 10/2013 | Gerstberger ....... G01C 21/3469 701/420 |
| 2015/0088409 A1 | 3/2015 | Thomas |
| 2016/0035001 A1 | 2/2016 | Driscoll et al. |

* cited by examiner

|  | COST | DISTANCE | TIME | TRAFFIC |
|---|---|---|---|---|
| ENERGY SOURCE A | $ 2.72 | 2.2 mi | +8 min | MODERATE |
| ENERGY SOURCE B | $ 2.88 | 4.1 mi | +15 min | NONE |
| ENERGY SOURCE C | $ 3.05 | 1.9 mi | +7 min | HEAVY |
| ENERGY SOURCE D | $ 3.89 | .8 mi | +3 min | LIGHT |
| ENERGY SOURCE E | $ 3.25 | .7 mi | +4 min | HEAVY |
| ENERGY SOURCE F | $ 1.98 | 7.2 mi | +20 min | LIGHT |
| ENERGY SOURCE G | $ 2.91 | 1.1 mi | +10 min | MODERATE |

FIG. 3

OPTIMAL ENERGY SOURCE DETERMINATION SYSTEM

BACKGROUND

1. Field

The present disclosure relates to a system and a method for providing navigation instructions, and more particularly to a system and a method for providing navigation instructions for determining energy source locations to include in a route.

2. Description of the Related Art

Navigation systems are capable of providing navigation instructions to a user based on a current location and a desired destination. Navigation systems may be used in vehicles for providing driving directions. These navigation systems utilize Global Positioning System (GPS) technology for estimating the current location of the vehicle and generating a series of instructions to guide the user to the destination. In typical usage, the driver or another occupant inside the vehicle inputs the destination name or address via an interface (e.g., an LCD screen) on the navigation system. Once the address is received, the navigation system maps a route and provides instructions verbally or displays the instructions on a map or a screen, or both. As the driver begins driving the vehicle, the navigation system may provide turn-by-turn directions, verbally instructing the driver which road to stay on, which exit to take, and where to make a turn, thereby assisting the driver in reaching the desired destination.

Separately, the driver may utilize another service to determine energy source prices (e.g., gasoline prices or electric charging station prices). The user may identify an energy source location and manually incorporate the energy source location into a previously generated route. However, manually incorporating a separately identified energy source location into a previously generated route may not provide an optimal route, as there may be a more cost-efficient alternative, when considering the trip as a whole or based on user preferences. Thus, there is a need for systems and methods for providing navigation instructions including optimal energy sources.

SUMMARY

What is described is a system for providing a recommended route for a vehicle, from a current location to an intermediate destination, to a final destination. The system includes a memory configured to store energy source location data and energy source cost data associated with a plurality of energy sources. The system also includes a vehicle energy sensor configured to detect vehicle energy data and vehicle energy efficiency data. The system also includes an electronic control unit (ECU) configured to determine a vehicle range based on the vehicle energy data and the vehicle energy efficiency data, the vehicle range exceeding a distance between the current location of the vehicle and the intermediate destination. The ECU is also configured to determine a baseline route having a first section between the current location and the intermediate destination, and a second section between the intermediate destination and the final destination. The ECU is also configured to determine a first energy source from the plurality of energy sources within a predetermined range of the first section and a second energy source from the plurality of energy sources within the predetermined range of the second section based on the energy source location data and the energy source cost data. The ECU is also configured to determine a first cost associated with incorporating the first energy source into the baseline route and a second cost associated with incorporating the second energy source into the baseline route, the first cost and the second cost based on the energy source location data and the energy source cost data. The ECU is also configured to determine the recommended route based on the first cost and the second cost, the recommended route including the first energy source when the first cost is lower than the second cost or the recommended route including the second energy source when the first cost exceeds the second cost. The system also includes an output unit configured to output the recommended route.

Also described is a vehicle providing a recommended route, from a current location to an intermediate destination, to a final destination. The vehicle includes a memory configured to store energy source location data and energy source cost data associated with a plurality of energy sources. The vehicle also includes a vehicle energy sensor configured to detect vehicle energy data and vehicle energy efficiency data. The vehicle also includes an electronic control unit (ECU) configured to determine a vehicle range based on the vehicle energy data and the vehicle energy efficiency data, the vehicle range exceeding a distance between the current location of the vehicle and the intermediate destination. The ECU is also configured to determine a baseline route having a first section between the current location and the intermediate destination, and a second section between the intermediate destination and the final destination. The ECU is also configured to determine a first energy source from the plurality of energy sources within a predetermined range of the first section and a second energy source from the plurality of energy sources within the predetermined range of the second section based on the energy source location data and the energy source cost data. The ECU is also configured to determine a first cost associated with incorporating the first energy source into the baseline route and a second cost associated with incorporating the second energy source into the baseline route, the first cost and the second cost based on the energy source location data and the energy source cost data. The ECU is also configured to determine the recommended route based on the first cost and the second cost, the recommended route including the first energy source when the first cost is lower than the second cost or the recommended route including the second energy source when the first cost exceeds the second cost. The vehicle also includes an output unit configured to output the recommended route.

Also described is a method for providing a recommended route for a vehicle, from a current location to an intermediate destination, to a final destination. The method includes storing, by a memory, energy source location data and energy source cost data associated with a plurality of energy sources. The method also includes detecting, by a vehicle energy sensor, vehicle energy data and vehicle energy efficiency data. The method also includes determining, by an electronic control unit (ECU), a vehicle range based on the vehicle energy data and the vehicle energy efficiency data, the vehicle range exceeding a distance between the current location of the vehicle and the intermediate destination. The method also includes determining, by the ECU, a baseline route having a first section between the current location and the intermediate destination, and a second section between the intermediate destination and the final destination. The method also includes determining, by the ECU, a first energy source from the plurality of energy sources within a predetermined range of the first section and a second energy source from the plurality of energy sources within the predetermined range of the second section based on the energy source location data and the energy source cost data. The method also includes determining, by the ECU, a first cost associated with incorporating the first energy source into the baseline route and a second cost associated with incorporating the second energy source into the baseline route, the first cost and the second cost based on the energy source location data and the energy source cost data. The method also includes determining, by the ECU, the recommended route based on the first cost and the second cost, the recommended route including the first energy source when the first cost is lower than the second cost or the recommended route including the second energy source when the first cost exceeds the second cost. The method also includes outputting, by an output unit, the recommended route.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 3 illustrates an energy source table, according to an embodiment of the invention;

DETAILED DESCRIPTION

Figure 1:
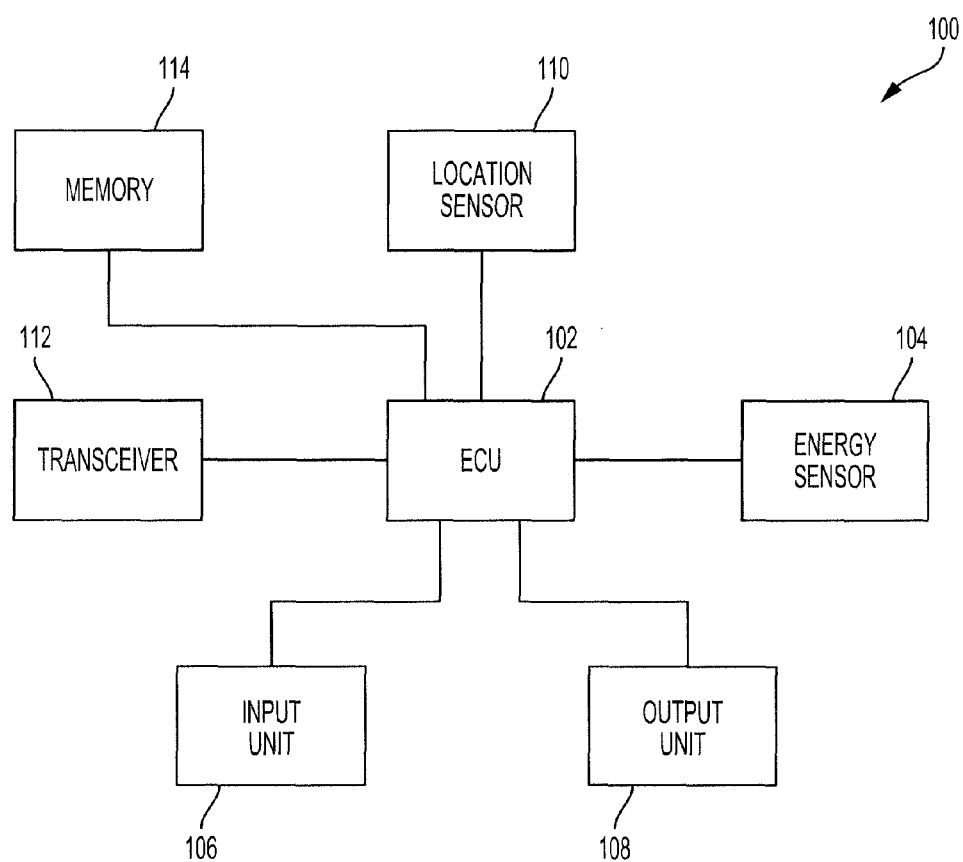
FIG. 1 depicts a block diagram of a vehicle, according to an embodiment of the invention.

Disclosed herein are systems and methods for providing navigation instructions that include optimal energy sources. The systems and methods provide several benefits and advantages such as providing optimized navigation instructions to individuals, particularly those who are travelling on a trip where energy source cost may fluctuate throughout the course of the trip, such that refueling or recharging in higher cost areas may be avoided. Determining navigation instructions including optimal energy sources provides benefits and advantages such as the ability to strategically include energy sources providing energy at a lower cost. For example, a driver may be travelling from Los Angeles, Calif. to Philadelphia, Pa., with at least one intermediate stop in Denver, Colo. A driver separately determining an energy source location to incorporate into the route may incorporate an energy source in Denver into the predetermined route. However, the cost of energy in Denver may be considerably higher than the areas surrounding it, and a more cost-efficient option may be to obtain energy before reaching Denver at a location not far from the freeway, and then obtaining energy after leaving Denver at another location not far from the freeway. The optimal energy source determination system may determine this more cost-efficient route by taking various factors, such as vehicle data, energy source location data, energy source cost data, environment data, and user preferences into consideration when determining the route.

An exemplary system includes a memory configured to store energy source location data and energy source cost data associated with a plurality of energy sources. The system also includes a vehicle energy sensor configured to detect vehicle energy data and vehicle energy efficiency data. The system also includes an electronic control unit (ECU) configured to determine a vehicle range based on the vehicle energy data and vehicle energy efficiency data, the vehicle range exceeding a distance between the current location of the vehicle and the intermediate destination. The ECU is also configured to determine a baseline route having a first section between the current location and the intermediate destination, and a second section between the intermediate destination and the final destination. The ECU is also configured to determine a first energy source from the plurality of energy sources within a predetermined range of the first section and a second energy source from the plurality of energy sources within the predetermined range of the second section based on the energy source location data and energy source cost data. The ECU is also configured to determine a first cost associated with incorporating the first energy source into the baseline route and a second cost associated with incorporating the second energy source into the baseline route, the first cost and the second cost based on the energy source location data and the energy source cost data. The ECU is also configured to determine the recommended route based on the first cost and the second cost, the recommended route including the first energy source when the first cost is lower than the second cost or the recommended route including the second energy source when the first cost exceeds the second cost. The system also includes an output unit configured to output the recommended route.

As used herein, "energy source" may refer to any source of energy for powering a vehicle, such as a gas station or a recharging station. Also as used herein, "energy source location" refers to the location of the energy source and "energy source cost" refers to a cost associated with a unit of energy for purchase at the energy source, such as dollars per gallon of fuel or dollars per kilowatt hour of electricity.

FIG. 1 illustrates a block diagram of a vehicle 100 of the optimal energy source determination system. The vehicle 100 may be an electric vehicle using electricity as an energy source, an internal combustion engine using fuel or gasoline as an energy source, a hybrid vehicle using both electricity and fuel as an energy source, a fuel cell vehicle using hydrogen as an energy source, or any combination therein. The vehicle 100 may be a vehicle operated by an individual, operated autonomously, remotely operated, or any combination therein.

The vehicle 100 includes, for example, an electronic control unit (ECU) 102 connected to a vehicle energy sensor 104, an input unit 106, an output unit 108, a location sensor 110, a transceiver 112, and a memory 114.

The vehicle energy sensor 104 is connected to the ECU 102. The vehicle energy sensor 104 is configured to detect vehicle energy data and vehicle energy efficiency data. The vehicle energy data may indicate a current energy of the vehicle 100 to power a motor or engine. For example, the vehicle energy data may be a number of gallons of fuel for an internal combustion engine vehicle or a state of charge for an electronic vehicle, or both, for a hybrid vehicle. The vehicle energy efficiency data may indicate an efficiency with which the vehicle 100 uses the vehicle energy, such as miles per gallon, miles per kilowatt hour, or miles per gallon gasoline equivalent (MPGe). The vehicle energy efficiency data may also include an efficiency value, in particular environmental conditions, as environmental conditions may affect the efficiency with which energy is used. The environmental conditions may include type of terrain (e.g., paved roads, gravel roads, dirt roads), an incline or decline, a number of lanes in the road, or a weather condition (e.g., raining, sunny, cloudy).

The input unit 106 is connected to the ECU 102 and configured to receive input from a user. The input unit 106 may include a microphone, a keypad, a keyboard, a touchpad or any other input device. A user may input destinations or user preferences via the input unit 106. The user preferences may indicate the user's priorities and may be considered when determining an energy source to incorporate into the recommended route. For example, the user preferences may be a list provided by the user of the user's priorities, such as cost, time, traffic and distance. In another example, the user preferences may be a number associated with various factors indicating the user's priorities, such as Cost: 10, Time: 8, Traffic: 3, Distance: 2.

The output unit 108 is connected to the ECU 102 and configured to output information. The output unit 108 may include a display configured to display an image or a series of images, or a speaker configured to produce sounds. The output unit 108 may output a recommended route. The outputting of the recommended route may include displaying a map of the route. The outputting of the recommended route may also include displaying and audibly speaking navigation instructions.

The location sensor 110 is connected to the ECU 102 and configured to determine a location of the vehicle 100. The location sensor 110 may be a GPS unit capable of receiving GPS signals and determining a location of the vehicle 100. The location of the vehicle 100 may be in geographical coordinates, such as latitude and longitude.

The transceiver 112 may be a receiver and/or a transmitter configured to receive and transmit data from a remote data storage or other device. The transceiver 112 may include an antenna capable of transmitting and receiving wireless communications. For example, the antenna may be a Bluetooth or Wi-Fi antenna, a cellular radio antenna, a radio frequency identification (RFID) antenna or reader and/or a near field communication (NFC) unit.

The transceiver 112 is configured to receive energy source location data, energy source cost data, traffic data and/or weather data. The energy source location data may indicate where a particular energy source is located. The energy source location data may be map coordinates, GPS coordinates, or any other indicator of location of the energy source.

The energy source cost data may indicate a cost associated with obtaining energy from the energy source, such as dollars per gallon of fuel or dollars per kilowatt hour of electricity. The energy source cost data may also include a waiting time at the energy source. The waiting time at the energy source may be a real-time waiting time or may be an estimated waiting time based on past waiting times. The waiting time may be factored into the energy source cost data using a conversion of minutes to dollars, which may be adjusted by the user. For example, the cost of 87-octane gasoline at a particular gas station may be $1.15, but there may be a current waiting time of 20 minutes to use a pump. The cost of $1.15 per gallon may be augmented by a value of the user's time to reflect an effective cost to the user. If the user's time is valuable, the adjusted cost may be $3.20 per gallon. If the user can spare the time, the value of the user's time may only slightly augment the cost to an adjusted cost of $1.20 per gallon or may not augment the cost at all, and the cost may remain $1.15 per gallon. The value of the user's time may be determined based on the user preferences or may be provided by the user via input unit 106.

The memory 114 is connected to the ECU 102 and configured to store data. The memory 114 may store any data described herein, such as vehicle energy data, vehicle energy efficiency data, energy source location data, energy source cost data, traffic data, weather data, and map data.

Figure 2:
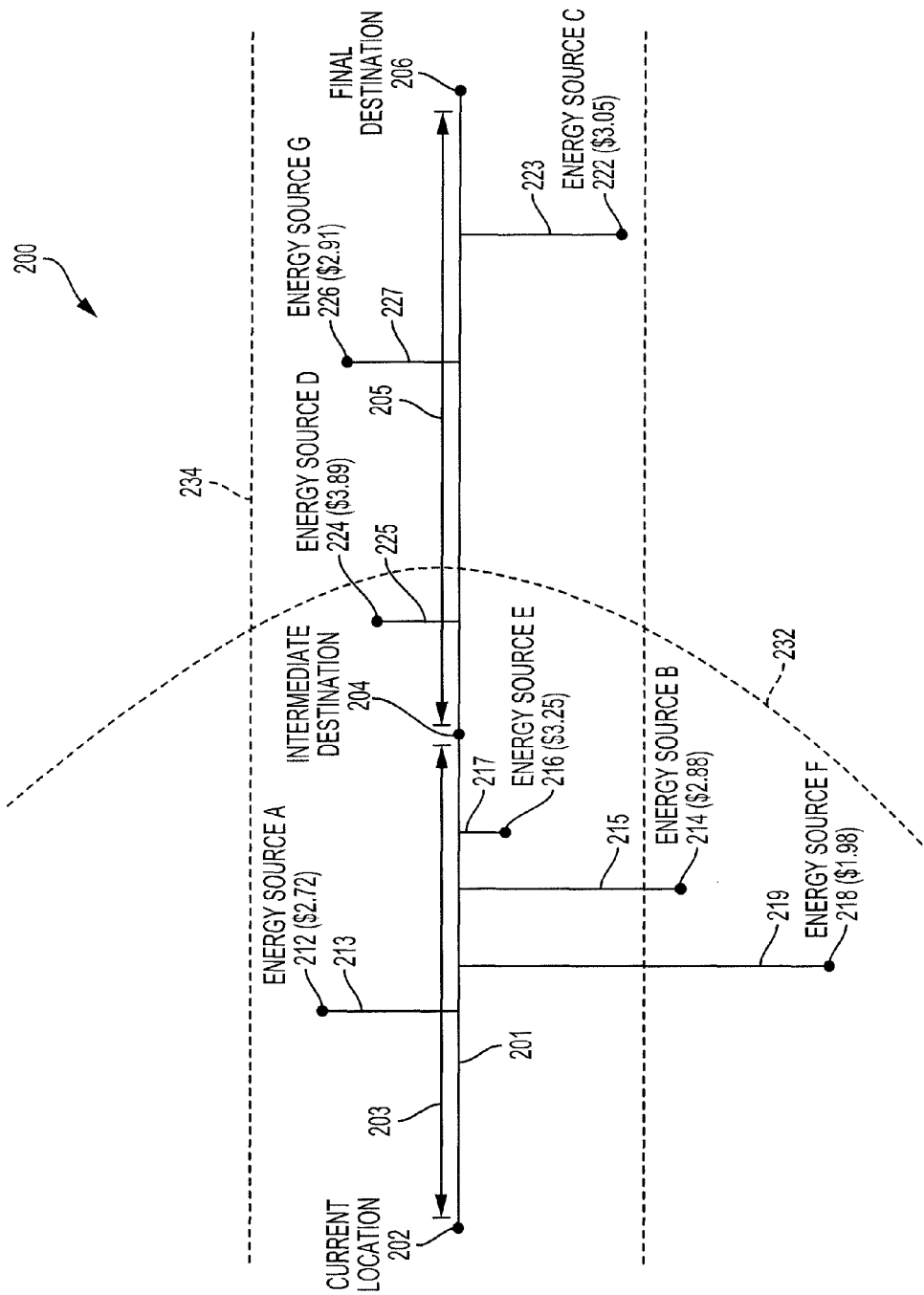
FIG. 2 illustrates an example situation where the optimal energy source location determination system may be used, according to an embodiment of the invention.

FIG. 2 illustrates an example situation where the optimal energy source location determination system may be used, according to an embodiment of the invention.

The map 200 or portions thereof may be displayed by the output unit 108. The map 200 includes a current location 202, an intermediate destination 204, and a final destination 206. A vehicle 100 driven by a user may be located at the current location 202. A baseline route 201 to the final destination 206 from the current location 202 may be divided into a first section 203 and a second section 205. The baseline route 201 may be determined by the ECU 102. The baseline route 201 may be determined based on any criteria, such as distance, time, or cost.

The intermediate destination 204 may be a planned stop on the trip and may be entered by the user via the input unit 106. For example, a user who enters a final destination of Philadelphia, Pa. with a current location of Los Angeles, Calif. may enter in an intermediate destination 204 of Las Vegas, Nev. In some embodiments, multiple intermediate destinations may be entered. For example, multiple intermediate destinations of Denver, Colo., Indianapolis, Ind., and Columbus, Ohio may be provided by the user, and the systems and methods described herein may be applied to each of the intermediate destinations.

The intermediate destination 204 may be determined by the ECU 102. In some embodiments, the ECU 102 predicts the intermediate destination 204 based on the vehicle location history data of the vehicle 100 stored in the memory 114. For example, if on a previous trip from Los Angeles, Calif. to Philadelphia, Pa., the user stopped in Denver, Colo. on the way, Denver Colo. may be determined to be the intermediate destination 204. In another example, the final destination and the current location may both be the same location, such as the user's home, and the intermediate destination may be a place the user regularly goes to, such as the user's workplace.

In some embodiments, the ECU 102 determines the intermediate destination 204 based on proximity to a baseline route between the current location 202 and the final destination 206. For example, when the user currently located in Los Angeles, Calif. inputs a final destination of Philadelphia, Pa., the ECU 102 may determine a baseline route which includes travelling through Albuquerque, N. Mex. Accordingly, Albuquerque, N. Mex. may be determined to be the intermediate destination 204.

In some embodiments, the ECU 102 determines the intermediate destination 204 based on vehicle location history data of other vehicles travelling to the final destination 206. The location data of the other vehicles may be received by the transceiver 112. For example, many vehicles may commonly stop at a particular location on their way to the final destination 206. The particular location may be determined by the ECU 102 as the intermediate destination 204.

While one intermediate destination 204 is shown, many intermediate destinations may be included in the trip and the optimal energy source determination system may accordingly consider the multiple intermediate destinations and generate a recommended route. In addition, the user may input a number of intermediate destinations and the ECU may determine additional intermediate destinations between the current location and the final destination.

Along the first section 203, there are a number of energy sources: Energy Source A 212, Energy Source B 214, Energy Source E 216, and Energy Source F 218, which have corresponding distances 213, 215, 217 and 219. Energy Source A 212, Energy Source B 214, Energy Source E 216 and Energy Source F 218 each also has an associated cost of $2.72, $2.88, $3.25 and $1.98, respectively. Along the second section 205, there are also a number of energy sources: Energy Source C 222, Energy Source D 224 and Energy Source G 226 with corresponding distances 223, 225 and 227. Energy Source C 222, Energy Source D 224 and Energy Source G 226 each also has an associated cost of $3.05, $3.89, and $2.91, respectively. As described herein, the location of the energy sources may be included in energy source location data received by the vehicle via the transceiver 112 and stored in the memory 114. The cost associated with the energy sources may be included in the energy source cost data received by the vehicle via the transceiver 112 and stored in the memory 114. The distances 213, 215, 217, 219, 223, 225, and 227 may represent distance and/or time associated with travelling to the corresponding energy source location. The distances may be relative to the current location 202 or relative to the baseline route 201.

The vehicle range 232 represents a range of the vehicle based on the current energy of the vehicle and the energy efficiency of the vehicle. The vehicle range 232 may be determined by the ECU 102 based on the vehicle energy data and the vehicle energy efficiency data detected by the vehicle energy sensor 104. As shown in FIG. 2, Energy Source A 212, Energy Source B 214, Energy Source D 224, Energy Source E 216 and Energy Source F 218 are within the vehicle range 232.

The detour range 234 represents a range within which the user is willing to drive to reach an energy source. The detour range 234 may be predetermined by the user, may be input via the input unit 106, may be changed, and may be stored in the memory 114. As shown in FIG. 2, Energy Source A 212, Energy Source C 222, Energy Source D 224, Energy Source E 216 and Energy Source G 226 are within the detour range 234.

As the vehicle 100 is unable to travel to the final destination 206 from the current location 202 without obtaining more energy, the ECU 102 may determine an energy source to include in the baseline route 201. The ECU 102 may consider energy sources within vehicle range 232: Energy Source A 212, Energy Source B 214, Energy Source D 224, Energy Source E 216 and Energy Source F 219. The ECU 102 may also consider the detour range 234, and Energy Source B 214 and Energy Source F, being outside the detour range 234, may be eliminated from consideration. The ECU 102 may compare a cost associated with incorporating an energy source before reaching the intermediate destination 204 with a cost associated with incorporating an energy source after reaching the intermediate destination 204, and incorporating the cheaper energy source into the route.

Energy Source A may have a corresponding Cost A, which may include a price of $2.72 per unit of energy to be purchased, as well as a cost of an amount of energy expended by the vehicle to travel distance 213. Correspondingly, Energy Source D 224 and Energy Source E 216 may have associated Cost D and Cost E, respectively. Cost A may also include a cost of obtaining energy again before reaching the Final Destination 206. For example, if the vehicle stops at Energy Source A 212, the vehicle may need to stop again at Energy Source C 222 or Energy Source G 226 to obtain more energy before reaching the final destination 206. If the vehicle instead stops at Energy Source D 224, the vehicle may not require another stop before reaching the final destination 206. In some situations, the cost of energy at Energy Source A 212 and Energy Source C 222 may be sufficiently cheap when compared to the cost of energy at Energy Source D 224, such that despite including an additional stop, including Energy Source A 212 and Energy Source C 222 results in the more cost-effective route.

The ECU 102 determines the energy source(s) to include in the baseline route 201 and outputs a recommended route including the energy source(s) using the output unit 108.

FIG. 3 illustrates an energy source table, according to an embodiment of the invention. When determining whether to incorporate a given energy source into the current route, the ECU 102 may consider multiple aspects of each energy source. The ECU 102 may consider a cost associated with obtaining energy from the energy source, which may or may not include the cost of travelling a corresponding distance to the energy source. The ECU 102 may also consider a distance associated with the energy source. The user may predetermine a threshold distance such that energy sources farther away from the route than the threshold distance are disqualified from consideration. The ECU 102 may also consider a time associated with travelling to the particular energy source. The ECU 102 may also consider a traffic level associated with travelling to the particular energy source. While the time associated with travelling to an energy source may be based on a combination of distance and traffic, traffic may be separately considered, as the user may establish preferences of traffic tolerance. For example, a particular user may be willing to drive 12 minutes in no traffic or light traffic, but may be unwilling to drive for 7 minutes in heavy traffic.

The user may identify user preferences related to the multiple aspects of each energy source. The user preferences may be incorporated into the determination of whether to incorporate a given energy source by using a weighting of the aspects of each energy source. For example, if the user is interested in the most cost-efficient route by any means, even if it entails enduring heavy traffic, a weight associated with cost and a weight associated with traffic may be adjusted accordingly.

With reference to FIGS. 2 and 3, when the vehicle 100 is at the current location 202 and a route to the intermediate destination 204 and then to the final destination 206 is determined, the ECU 102 may then determine which energy source to incorporate into the route. The vehicle 100 may have a capacity for 10 units of energy (e.g., gallons of gasoline or kWh of electricity).

In an example embodiment, the user may prefer cost efficiency over any other consideration, and the detour range 234 may include all energy sources within 3 miles. The ECU 102 identifies energy sources within the vehicle range 232 and within 3 miles of the baseline route. As a result, Energy Source A 212, Energy Source E 216, and Energy Source D 224 are considered. The ECU 102 compares a composite value of each energy source before reaching the intermediate destination 204 (Energy Source A 212 and Energy Source E 216) against energy sources after reaching the intermediate destination 204 (Energy Source D 224), and the energy source with the lowest value is incorporated into the route.

As cost is the only user preference in this example embodiment, the composite value associated with Energy Source D 224 may be $38.90—the cost of obtaining 10 units of energy at Energy Source D.

The composite value associated with Energy Source A may include a cost of obtaining 5 units of energy at Energy Source A. The vehicle 100 may only obtain 5 units of energy at Energy Source A because vehicle 100 has 5 units of energy still remaining. In addition, as vehicle 100 may not reach the final destination 206 without another stop, the composite value associated with Energy Source A may also include a cost of obtaining 5 units of energy at Energy Source G. The vehicle 100 may only consume 5 units of energy between Energy Source G and the final destination 206. This results in a composite value of $13.60+ $14.55=$28.15. Thus, incorporating Energy Source A into the route (and accordingly Energy Source G) is more cost-efficient than incorporating Energy Source D.

The composite value associated with Energy Source E includes a cost of obtaining 7 units of energy at Energy Source E and 3 units of energy at Energy Source C. This results in a composite value of $22.75+$9.15=$31.90. While the combination of Energy Source C and Energy Source E is more cost-efficient than Energy Source D, the combination of Energy Source C and Energy Source E is not as cost-efficient as the combination of Energy Source A and Energy Source G.

The baseline route 201 is updated to include Energy Source A and Energy Source G, and a recommended route including Energy Source A and Energy Source G is output to the user by output unit 108. An amount of energy to obtain at each energy source may also be output by the output unit 108. In some embodiments, a composite value of all locations is determined without consideration of location relative to the intermediate destination 204 and the ECU 102 accordingly determines the recommended route based on the composite values of all of the energy sources.

In another example embodiment, the user may value cost-efficiency most, but may also prefer less traffic and energy sources within 3 miles. As described above, a composite value associated with Energy Source A (which may entail use of Energy Source G), and a composite value associated with Energy Source E (which may entail use of Energy Source C) is compared with a composite value associated with Energy Source D.

The composite value associated with Energy Source A is based on the cost of $28.15 as described above, moderate traffic associated with Energy Source A, and moderate traffic associated with Energy Source G. The cost and traffic associated with Energy Source A and Energy Source G may be weighted based on user preferences. The cost of $28.15 may be weighted by a factor of 10 (corresponding with the user's cost efficiency preference) resulting in a weighted cost value of 281.5. A numeric value may be associated with different levels of traffic and weighted. The 2.2 miles of moderate traffic associated with Energy Source A and the 1.1 miles of moderate traffic associated with Energy Source G, weighted by a factor of 5 (corresponding with the user's traffic preference) may result in a weighted traffic value of 156.2. The composite value associated with Energy Source A is therefore 437.7.

Similarly, a composite value associated with Energy Source E may be determined as 621.2 due to heavy traffic. A composite value associated with Energy Source D may be determined by the ECU 102 as 402.1. As Energy Source D has the lower composite value when compared to Energy Source A, Energy Source D is incorporated into the baseline route 201 and the recommended route is output by the output unit 108.

In yet another example embodiment, the user may value cost-efficiency moderately, may not tolerate heavy traffic, may strongly prefer to drive a shorter amount of time, and may have a detour range of 5 miles. As such, Energy Source E is disqualified based on traffic and Energy Source F is disqualified based on distance. Accordingly, Energy Source A, Energy Source B, and Energy Source D are compared.

The energy cost of $28.15 associated with Energy Source A is weighted by a factor of 5 (corresponding to the user's cost preference), resulting in a weighted cost value of 140.75. The added driving time associated with Energy Source A, weighted by a factor of 10 (corresponding to the user's time preference), may result in a weighted time value of 155.1. The composite value associated with Energy Source A is 295.85.

Similarly, a composite value associated with Energy Source B may be determined as 360.8 due to the additional 15 minutes of travel time added by Energy Source B, and a composite value associated with Energy Source D may be 260.7, as it only has a 3 minute distance associated with it. The ECU 102 may compare Energy Source D with the lower of Energy Source A and Energy Source B, and determine that Energy Source D has the lower associated composite value. Energy Source D is incorporated into the baseline route 201 and the recommended route is output by the output unit 108.

As illustrated by the above example embodiments, energy sources incorporated into a route may be altered based on the user preferences input by the user. In this way, the energy locations incorporated into a route are not only optimized based on vehicle data and energy source data, but also optimized based on user data in the form of user preferences. While the example embodiments illustrate an energy source with the lowest composite value being incorporated into the baseline route, weightings and values assigned to each aspect (e.g., cost, time, distance, traffic) may be adjusted such that the energy source with the highest composite value is incorporated. Further, any other consistently implemented scheme of evaluating energy sources may be used.

Figure 4:
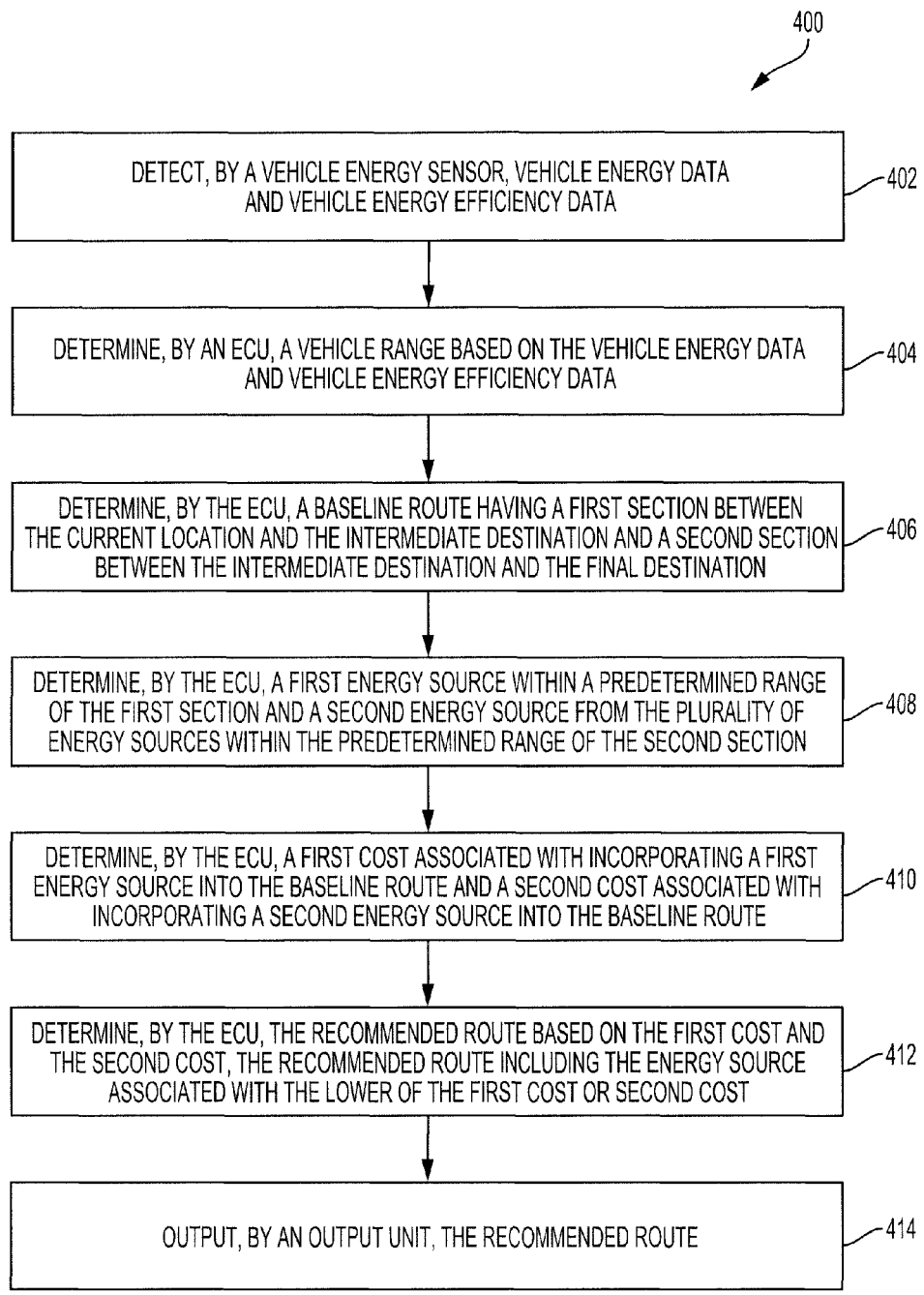
FIG. 4 illustrates an example of a flowchart describing an operation of the optimal energy source location determination system, according to an embodiment of the invention.

FIG. 4 illustrates a flowchart of a method of operation of the optimal energy source determination system, according to an embodiment of the invention. In an example embodiment, the optimal energy source determination system may be used when a vehicle 100 is at a current location and travelling to an intermediate destination and then to a final destination. The intermediate destination may be entered by the user or may be determined by the ECU 102.

A vehicle energy sensor 104 detects vehicle energy data and vehicle energy efficiency data (step 402). As described herein, the vehicle energy data may indicate a current amount of energy of the vehicle and the vehicle energy efficiency data may indicate an efficiency with which the energy is used. For example, if the vehicle is an internal combustion engine vehicle using gasoline as energy, the vehicle energy data may indicate a current amount of gasoline remaining in gallons, and the vehicle energy efficiency data may indicate a gasoline efficiency, such as miles per gallon. In another example, if the vehicle is an electric vehicle using electricity as energy, the vehicle energy data may indicate a current state of charge and the vehicle energy efficiency data may indicate an electricity efficiency, such as miles per kilowatt hour.

The ECU 102 connected to the vehicle energy sensor 104, may determine a vehicle range based on the vehicle energy data and the vehicle energy efficiency data (step 404). For example, the ECU 102 may determine the vehicle range by multiplying a remaining amount of energy by the energy efficiency in order to determine a distance the vehicle may travel based on the current energy level. The ECU 102 may display the range on a map using output unit 108.

The ECU 102 determines a baseline route having a first section between the current location and the intermediate destination, and a second section between the intermediate destination and the final destination (step 406). The intermediate destination may be within vehicle range of the vehicle, but the final destination may be outside the vehicle range of the vehicle. The baseline route may be determined by any criteria, such as time, distance, or cost.

The ECU 102 determines a first energy source within a predetermined detour range of the first section and a second energy source within the predetermined detour range of the second section (step 408). The first energy source may be reached before reaching the intermediate destination and the second energy source may be reached after reaching the intermediate destination.

The predetermined detour range may be established by a user and may be communicated to the vehicle 100 via the input unit 106. For example, if the user can tolerate a long detour, the user may establish the predetermined detour range as being 10 miles. If the user is less tolerant of a longer detour, the user may establish the predetermined detour range as being 2 miles. A secondary effective detour range may be established by the ECU 102 based on the vehicle range. For example, if the user establishes a predetermined detour range of 10 miles, but the vehicle range is only 4 miles, the ECU 102 may use the vehicle range as being the detour range.

The ECU 102 determines a first cost associated with incorporating the first energy source into the baseline route and a second cost associated with incorporating the second energy source into the baseline route (step 410). The first cost and the second cost may be based on a cost of energy obtained at the respective energy source. The first cost and the second cost may also be based on an amount of energy expended to reach the respective energy source. The ECU 102 may consider the overall impact of incorporating a given energy source into a route when determining a cost of the energy source. For example, by incorporating a particular energy source into the baseline route, the ECU 102 may determine that an additional stop further in the trip must be added in order to reach the final destination. In this regard, when determining whether an additional stop must be added, the ECU 102 may use past vehicle energy data and/or past vehicle energy efficiency data stored in the memory 114.

The ECU 102 determines a recommended route based on the first cost and the second cost (step 412). When the first cost is lower, the first energy source is a part of the recommended route. When the second cost is lower, the second energy source is a part of the recommended route. As disclosed herein, other factors, such as traffic, time and distance associated with each energy source may be considered when determining the recommended route.

The output unit 108 outputs the recommended route (step 414). The output unit 108 may include a speaker to audibly instruct navigation instructions of the recommended route. The output unit 108 may include a display to display the recommended route as a list of navigation instructions or display the recommended route on a map.

Figure 5:
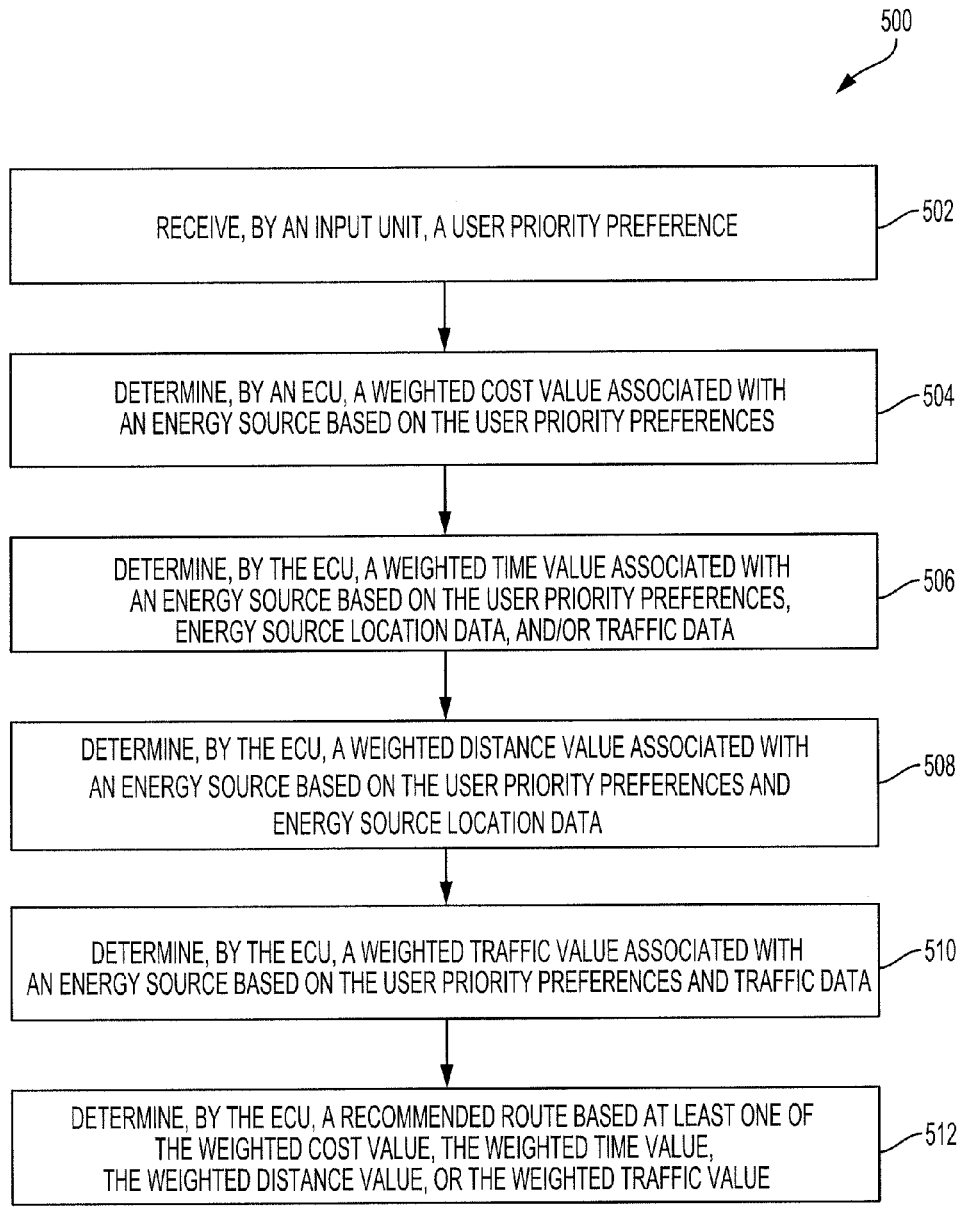
FIG. 5 illustrates an example of a flowchart describing a further operation of the optimal energy source location determination system, according to an embodiment of the invention.

FIG. 5 illustrates a flowchart of a method of operation of the optimal energy source location determination system, according to an embodiment of the invention. Once one or more potential energy sources are identified, a composite value for each of the potential energy sources may be determined by the ECU 102. The composite value may be based on a combination of factors, such as cost, time, distance, and traffic associated with each energy source. The energy source to be included in the recommended route may be determined based on the composite values of each of the potential energy sources. In some embodiments, the steps illustrated in FIG. 5 may supplement or replace step 410 and step 412 of FIG. 4.

An input unit 106 receives user preferences (step 502). The user preferences may be a ranking of factors, such as cost, time, distance, and traffic. For example, a user who prefers a low cost route, but not at the expense of enduring bad traffic, and does not mind a longer route in terms of time and distance may represent the user preferences as an ordered list of: traffic, cost, distance, time. The user preferences may be a score assigned to each factor indicating importance to the user. For example, the same user who prefers a low cost route, but not at the expense of enduring bad traffic, and does not mind a longer route in terms of time and distance may represent the user preferences as values associated with each factor, such as: Traffic 10, Cost 8, Distance 2, Time 2. In some embodiments, the ordered list may be converted by the ECU 102 to a list of factors and associated values. The user preferences may be a list of threshold values for each factor, the threshold values indicating an upper bound. For example, the user may indicate the user is unwilling to endure worse than light traffic, is unwilling to travel more than 10 miles, and is unwilling to incorporate a detour longer than 15 minutes. When the user preferences are a list of threshold values, the system may assume that the user would prefer a most cost-efficient route given the list of threshold values.

The ECU 102 determines, for a given energy source, a weighted cost value associated with the energy source based on the user preferences and the energy source cost data (step 504). As described herein, the energy source cost data may be received via the transceiver 112 and indicate a cost associated with the given energy source. The cost associated with the given energy source may be augmented by the user preferences, resulting in a weighted cost value associated with the energy source.

The ECU 102 determines, for the given energy source, a weighted time value associated with the energy source based on the user preferences, the energy source location data, and/or traffic data (step 506). As described herein, the energy source location data and traffic data may be received via the transceiver 112. The energy source location data may be used with or without the traffic data to determine a time associated with incorporating the given energy source into the baseline route. The time associated with incorporating the given energy source into the baseline route may be augmented by the user preferences, resulting in a weighted time value associated with the energy source.

The ECU 102 determines, for the given energy source, a weighted distance value associated with the energy source based on the user preferences and the energy source location data (step 508). The distance associated with incorporating the given energy source into the baseline route may be augmented by the user preferences, resulting in a weighted distance value associated with the energy source.

The ECU 102 determines, for the given energy source, a weighted traffic value associated with the energy source based on the user preferences and traffic data (step 510). The traffic associated with incorporating the given energy source into the baseline route may be represented by a number and augmented by the user preferences, resulting in a weighted time value associated with the energy source.

The ECU 102 determines a recommended route based on at least one of the weighted cost value, the weighted time value, the weighted distance value, or the weighted traffic value (step 512). The ECU 102 may consider multiple energy sources, and weighted cost values, weighted time values, weighted distance values, and weighted traffic values may be determined for each of the multiple energy sources and taken into consideration when determining the recommended route. Further, each of the aspects (e.g., cost, distance, traffic, time) may be represented by a number on a normalized scale before applying the user preferences in order to determine corresponding weighted values. For example, a cost of $35.22 may be represented by 352.2, heavy traffic may be represented by 602, a distance of 10 miles may be represented by 440, and a time of 3 minutes may be represented by 130.

As described herein, the ECU 102 considers, for example, vehicle data, traffic data, location data, cost data, and user preference data in determining a recommended route. Determining all of the possible routes incorporating various combinations of energy sources results in a more robust, more personalized recommended route than navigation systems considering time or distance alone. Further, manually determining all of the possible routes may be impossible for the user, as changing traffic conditions and changing energy source costs prevent a truly optimized route from being determined.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that the scope shall not be restricted, except in light of the appended claims and their equivalents.

What is claimed is:

1. A system for providing a recommended route for a vehicle, from a current location to an intermediate destination, and from the intermediate destination to a final destination, the system comprising:
   a memory configured to store vehicle location history data, energy source location data, and energy source cost data associated with a plurality of energy sources;
   a vehicle energy sensor configured to detect vehicle energy data and vehicle energy efficiency data;
   an electronic control unit (ECU) configured to:
      determine the intermediate destination by predicting the intermediate destination based on the vehicle location history data or by receiving the intermediate destination from an input unit, the intermediate destination being a stop between the current location and the final destination,
      determine a vehicle range based on the vehicle energy data and the vehicle energy efficiency data, the vehicle range exceeding a distance between the current location of the vehicle and the intermediate destination,
      determine a baseline route having a first section between the current location and the intermediate destination, and a second section between the intermediate destination and the final destination,
      determine a first energy source from the plurality of energy sources within a predetermined range along the first section and a second energy source from the plurality of energy sources within the predetermined range along the second section based on the energy source location data and energy source cost data, the first energy source and the second energy source being within the vehicle range,
      determine a first cost associated with incorporating the first energy source into the baseline route and a second cost associated with incorporating the second energy source into the baseline route, the first cost and the second cost based on the energy source location data and the energy source cost data,
      determine the recommended route based on the first cost and the second cost, the recommended route including the first energy source when the first cost is lower than the second cost or the recommended route including the second energy source when the first cost exceeds the second cost; and
   an output unit configured to output the recommended route.

2. The system of claim 1, further comprising an input unit configured to receive user preferences, and
   wherein the ECU is further configured to:
      determine a first weighted cost value associated with the first energy source and a second weighted cost value associated with the second energy source based on the user preferences,
      determine a first weighted time value associated with the first energy source and a second weighted time value associated with the second energy source based on the user preferences and the energy source location data, and
      determine the recommended route based on the first weighted cost value, the first weighted time value, the second weighted cost value, and the second weighted time value.

3. The system of claim 1, further comprising a transceiver configured to receive traffic data,
   wherein the input unit is further configured to receive a user priority identification, and
   wherein the ECU is further configured to:
      determine a first weighted cost value associated with the first energy source and a second weighted cost value associated with the second energy source based on the user preferences,
      determine a first weighted traffic value associated with the first energy source and a second weighted traffic value associated with the second energy source based on the user preferences and the traffic data, and
      determine the recommended route based on the first weighted cost value, the first weighted traffic value, the second weighted cost value, and the second weighted traffic value.

4. The system of claim 1, wherein the vehicle includes an internal combustion engine and wherein the plurality of energy sources includes gas stations.

5. The system of claim 1, wherein the vehicle includes a motor and wherein the plurality of energy sources includes charging stations.

6. A vehicle providing a recommended route, from a current location to an intermediate destination, and from the intermediate destination to a final destination, the vehicle comprising:

a memory configured to store vehicle location history data, energy source location data, and energy source cost data associated with a plurality of energy sources;

a vehicle energy sensor configured to detect vehicle energy data and vehicle energy efficiency data;

an electronic control unit (ECU) configured to:
  determine the intermediate destination by predicting the intermediate destination based on the vehicle location history data or by receiving the intermediate destination from an input unit, the intermediate destination being a stop between the current location and the final destination,
  determine a vehicle range based on the vehicle energy data and the vehicle energy efficiency data, the vehicle range exceeding a distance between the current location of the vehicle and the intermediate destination,
  determine a baseline route having a first section between the current location and the intermediate destination, and a second section between the intermediate destination and the final destination,
  determine a first energy source from the plurality of energy sources within a predetermined range along the first section and a second energy source from the plurality of energy sources within the predetermined range along the second section based on the energy source location data and the energy source cost data, the first energy source and the second energy source being within the vehicle range,
  determine a first cost associated with incorporating the first energy source into the baseline route and a second cost associated with incorporating the second energy source into the baseline route, the first cost and the second cost based on the energy source location data and the energy source cost data,
  determine the recommended route based on the first cost and the second cost, the recommended route including the first energy source when the first cost is lower than the second cost or the recommended route including the second energy source when the first cost exceeds the second cost; and an output unit configured to output the recommended route.

7. The vehicle of claim 6, further comprising an input unit configured to receive user preferences, and
wherein the ECU is further configured to:
  determine a first weighted cost value associated with the first energy source and a second weighted cost value associated with the second energy source based on the user preferences,
  determine a first weighted time value associated with the first energy source and a second weighted time value associated with the second energy source based on the user preferences and the energy source location data, and
  determine the recommended route based on the first weighted cost value, the first weighted time value, the second weighted cost value, and the second weighted time value.

8. The system of claim 6, further comprising a transceiver configured to receive traffic data,
  wherein the input unit is further configured to receive a user priority identification, and
  wherein the ECU is further configured to:
    determine a first weighted cost value associated with the first energy source and a second weighted cost value associated with the second energy source based on the user preferences,
    determine a first weighted traffic value associated with the first energy source and a second weighted traffic value associated with the second energy source based on the user preferences and the traffic data, and
    determine the recommended route based on the first weighted cost value, the first weighted traffic value, the second weighted cost value, and the second weighted traffic value.

9. The system of claim 6, wherein the vehicle includes an internal combustion engine and wherein the plurality of energy sources includes gas stations.

10. The system of claim 6, wherein the vehicle includes a motor and wherein the plurality of energy sources includes charging stations.

11. A method of providing a recommended route for a vehicle, from a current location to an intermediate destination, and from the intermediate destination to a final destination, the method comprising:
  storing, by a memory, vehicle location history data, energy source location data and energy source cost data associated with a plurality of energy sources;
  detecting, by a vehicle energy sensor, vehicle energy data and vehicle energy efficiency data;
  determining, by an electronic control unit (ECU), the intermediate destination by predicting the intermediate destination based on the vehicle location history data or by receiving the intermediate destination from an input unit, the intermediate destination being a stop between the current location and the final destination,
  determining, by the ECU, a vehicle range based on the vehicle energy data and the vehicle energy efficiency data, the vehicle range exceeding a distance between the current location of the vehicle and the intermediate destination;
  determining, by the ECU, a baseline route having a first section between the current location and the intermediate destination, and a second section between the intermediate destination and the final destination;
  determining, by the ECU, a first energy source from the plurality of energy sources within a predetermined range along the first section and a second energy source from the plurality of energy sources within the predetermined range along the second section based on the energy source location data and the energy source cost data, the first energy source and the second energy source being within the vehicle range;
  determining, by the ECU, a first cost associated with incorporating the first energy source into the baseline route and a second cost associated with incorporating the second energy source into the baseline route, the first cost and the second cost based on the energy source location data and the energy source cost data;
  determining, by the ECU, the recommended route based on the first cost and the second cost, the recommended route including the first energy source when the first cost is lower than the second cost or the recommended route including the second energy source when the first cost exceeds the second cost; and
  outputting, by an output unit, the recommended route.

12. The method of claim 11, further comprising:
  receiving, by an input unit, user preferences;
  determining, by the ECU, a first weighted cost value associated with the first energy source and a second weighted cost value associated with the second energy source based on the user preferences;

determining, by the ECU, a first weighted time value associated with the first energy source and a second weighted time value associated with the second energy source based on the user preferences and the energy source location data; and determining, by the ECU, the recommended route based on the first weighted cost value, the first weighted time value, the second weighted cost value, and the second weighted time value.

13. The method of claim 11, further comprising:

receiving, by a transceiver, traffic data;

receiving, by the input unit, a user priority identification;

determining, by the ECU, a first weighted cost value associated with the first energy source and a second weighted cost value associated with the second energy source based on the user preferences;

determining, by the ECU, a first weighted traffic value associated with the first energy source and a second weighted traffic value associated with the second energy source based on the user preferences and the traffic data; and determining, by the ECU, the recommended route based on the first weighted cost value, the first weighted traffic value, the second weighted cost value, and the second weighted traffic value.

14. The method of claim 11, wherein the plurality of energy sources includes gas stations or charging stations.

* * * * *